United States Patent Office 3,810,747
Patented May 14, 1974

3,810,747
GLASS MOLDING APPARATUS
Peter Bork, Karlsruhe, Germany, assignor to Siemens
Aktiengesellschaft, Munich, Germany
Filed Sept. 15, 1972, Ser. No. 289,621
Claims priority, application Germany, Sept. 17, 1971,
P 21 46 569.0
Int. Cl. C03b 9/38
U.S. Cl. 65—158                    2 Claims

ABSTRACT OF THE DISCLOSURE

A glass molding apparatus includes the feature of at least one hole formed axially in the wall of a blow mold, for example, the hole extending parallel to the cylindrical outside surface of the mold for substantially the length of the mold cavity. The hole contains a device of the same length producing a signal responsive to temperatures along the length of the device, such as an electric resistance temperature measuring device of the tubular type having a temperature responsive resistance wire extending throughout its length. The signal produced represents an average of the temperatures within the mold wall throughout the length of the hole. By using two such holes and devices which are radially aligned and interspaced, two signals are obtained which by interpolation may be used to determine the average heat flow rate through the mold's wall and the average surface temperature of the mold cavity.

BACKGROUND OF THE INVENTION

Hollow glassware is made by blowing molten glass into the cavity of a relatively thick-walled metal mold, the glass solidifying by its heat being lost to the mold's cavity surface and through the mold's wall. The production of satisfactory products depends on the temperature of the cavity surface, because if this temperature is not held within a relatively narrow temperature range, uniform solidification of the glass does not result. If the cavity surface is too cold, local differences in the wall thickness of the blown article will occur; if too hot, the glass sticks to the cavity surface. For quantity production, machines are used employing a large number of such molds.

In addition to being thick-walled, such a mold has a cylindrical exterior; the interior cavity shape is non-cylindrical, it depending on the desired shape of the product being produced. However, the cavity and mold exterior are concentric. Customarily, the molds are two-part molds which are vertically split.

Cavity surface temperature control is effected by continuously blowing air on the exteriors of the molds to remove the heat. The flow of air required for cavity surface heat removal to maintain the relatively limited temperature range is ordinarily done by manually adjusting the air flow. Insofar as is known, there has been no way to determine the cavity surface temperature other than by experienced machine operators judging the quality of the product. This eliminates any thought of using automatic controls for the air blowing equipment.

The equation for the heat conduction of ideal hollow cylinders, which are cylindrical inside and outside, exposed to a uniform flow reads:

$$3 - K1(\zeta_i - \zeta_a)$$

K1 is a constant, $\zeta_i$ is the temperature on a cylinder surface visualized as closer to the axis of the cylinder, and $\zeta_a$ is the temperature of the cylinder surface visualized further out; both cylinder surfaces are situated within the wall thickness of the hollow cylinder. The average heat flux through the wall of the hollow cylinder can therefore be expressed as a function of the temperature gradient. For ideal hollow cylinders, the temperatures $\zeta_i$ and $\zeta_a$ can be determined by means of two temperature sensors arranged in the wall of the hollow cylinder at the greatest possible radial distance from each other.

Accordingly, $$\zeta_x = \zeta_i K2(\zeta_i - \zeta_a)$$

holds for the average temperature $\zeta_x$ at the inner wall of the cylinder. The temperature at the inner wall, if it cannot be measured directly, can be determined from the above-stated Equation 2.

SUMMARY OF THE INVENTION

One of the objects of the present invention is to provide a way for determing at least the average heat flow rate and the average cavity surface temperature of a glass molding mold, particularly a hollow ware glass blow mold, regardless of the fact that its molding cavity is non-cylindrical in shape.

The present invention is based on the fact that test measurements of a glass hollow ware blow mold show that because of its thick wall and substantially cylindrical or cylindrical exterior or outside surface, the mold can be considered as an approximation of the ideal hollow cylinder, namely, one having a truly cylindrical surface inside and outside concentric with its axis.

Further, that by forming a hole in the relatively thick mold wall, the hole extending axially for substantially the full length of the mold cavity and parallel to the mold's exterior or outside surface, and by inserting in this hole a device of substantially corresponding length, that is temperature responsive throughout its length and provides a suitable signal, a reading of the average temperature throughout the length of the mold at the location of the hole can be determined. The device may be one of the prior art devices comprising a tubular casing containing an electric resistance wire throughout its length and having a resistance which depends on temperature.

By providing a second corresponding hole which is radially aligned with the first hole, the holes being radially spaced apart from each other as far as is practical considering the mold wall thickness, with a corresponding device inserted in this second hole, two signals can be obtained with the signals representing the lengthwise or axial average temperatures existing around the holes throughout the length of the wall through which the heat must travel from the mold cavity to its outside surface.

With the two average temperature readings thus obtained, the equations formerly given for an ideal cylinder may be applied to obtain the average heat flux or flow rate through the mold wall and also the average temperature of the cavity surface of the mold which cannot be measured directly in the sense of even an average value. Assuming the devices used provide electric signals, the latter may be fed to an electric computer having a visual readout or an electrical output which may be used to control the flow of cooling air directed to the outside of the mold. In this way it is possible to obtain much better control of the cavity surface temperature which could heretofore be only estimated by an experienced operator.

BRIEF DESCRIPTION OF THE DRAWINGS

The accompanying drawings illustrate preferred embodiments of the invention, the various figures being as follows.

DESCRIPTION OF THE PREFERRED EMBODIMENTS

Figure 1:
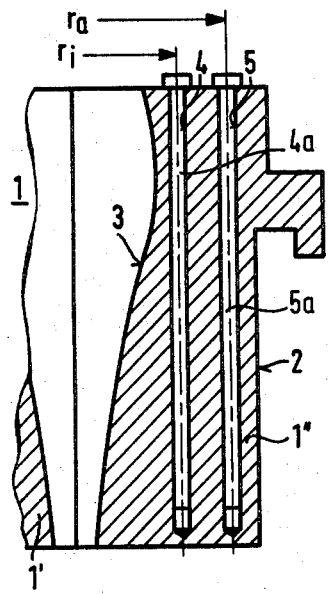
FIG. 1 is a vertical section of a blow mold, partially shown, incorporating the principles of the present invention.

FIG. 1 shows the right-hand side of a typical hollow glassware blow mold excepting for features described hereinafter. The conventional parts include the two metal parts 1' and 1" which when closed together form the overall mold 1 having the substantially cylindrical external surface 2, the non-cylindrical mold cavity, concentric with this surface 2, being shown at 3. The mold wall is relatively thick, and because of this thickness the mold in shape provides the approximation of an ideal hollow cylinder.

According to the invention, preferably a group of at least two holes 4 and 5 are drilled or otherwise formed axially into the mold's wall and almost to its bottom, these holes being interspace as much as possible and in radial alignment with each other relative to the mold's axis. The temperature responsive electric resistance devices 4a and 5a are inserted into these holes. Other devices producing temperature responsive signals could also be used, if having the same long tubular shape of the elements 4a and 5a and lengthwise temperature response. If the electric resistance type is arranged in a bridge circuit, the other resistance may be associated with the mold itself.

It is to be understood that whatever kind of device is used in the holes, it should preferably have a casing snugly or tightly fitting the hole for good heat conduction reasons, and the temperature responsive element contained by the casing should be temperature responsive throughout the tube's length to obtain readings of the average temperature. Where the mold wall is thinner, the temperature differences between the two holes will be different from those existing between the two holes where the mold wall is thicker.

Figure 4:
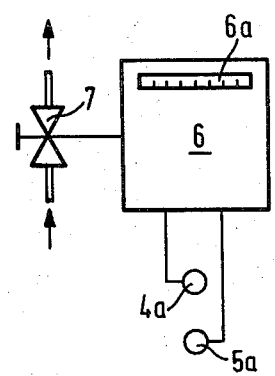
FIG. 4 schematically shows an application involving both a readout of the cavity temperature and an output effecting automatic control of the cooling air blowing equipment.

As shown by FIG. 4, the signals from the devices 4a and 5a may be fed to a suitable electronic computer 6 having a readout 6a and an output connected to an electrically responsive valve 7 controlling the cooling air flow applied to the mold exterior. This device should be programmed to apply the equations previously outlined.

Figure 2:
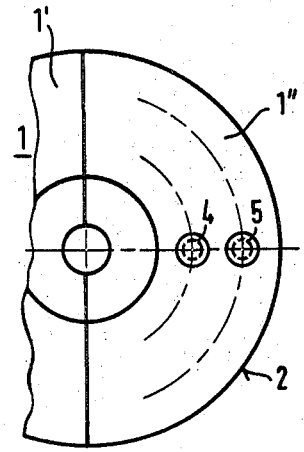
FIG. 2 is a plan of FIG. 1.

In FIG. 1 the two radial distances indicated, $\zeta_i$ and $\zeta_a$, represent, via the signal from the devices 4a and 5a, the average temperature values used for $\zeta_i$ and $\zeta_a$ when programming the computer 6. As shown by FIG. 2, the holes 4 and 5 bisect the two visualized cylindrical surfaces referred to hereinbefore, indicated in this figure by broken arcuate lines.

Figure 3:
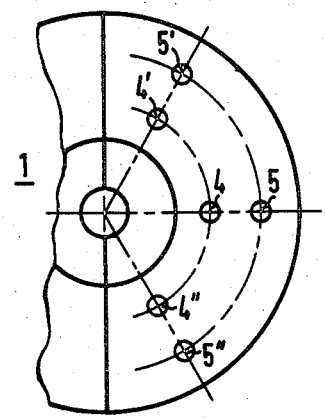
FIG. 3 is like FIG. 2 but shows a modification.

When maximum accuracy is desired, a number of groups of the holes 4 and 5 may be used as shown by FIG. 3 where the holes 4' and 5' of another group and the holes 4" and 5" of still another group all bisect the imaginery cylindrical surfaces. If groups of holes are used, they should be interspaced symmetrically and uniformly. All of the holes should contain the devices 4a and 5a previously described. The devices in the holes 4, 4', 4", etc. may be connected in series and their signals fed cumulatively to the computer 6, this correspondingly applying to the holes 5, 5' and 5". By switching it is possible to send the signal from each group of two holes only selectively to the computer or other indicating device to determine the uniformity circumferentially concerning the heat flows through the mold's wall and the cavity temperatures.

In all cases it is obvious that average values are involved. However, the realization that a glass molding mold may be considered as an approximation of an ideal cylinder and that a lengthwise reading of the mold wall temperature taken along a line parallel to the mold's exterior can provide average temperature values, average results, such as the average cavity surface temperature in particular, can be obtained, which are much more reliable and accurate than is possible when relying only upon skill and examination of the products produced.

What is claimed is:

1. A glass molding apparatus, comprising:
   a mold having a wall forming a substantially cylindrical outside surface, a non-cylindrical molding cavity substantially concentric with said outside surface, and at least one pair of interspaced, radially-aligned, axially-extending parallel holes formed in said wall and extending therein for at least substantially the entire length of said cavity substantially parallel to said surface;
   a plurality of signal transmitting devices positioned in said holes and extending for substantially the length of the latter, each of said signal transmitting devices being temperature responsive throughout its length so that its signal represents the average temperature of the wall length around each hole receiving heat radially from said cavity; and
   electronic computation means, coupled to said signal transmitting devices, for interpolating the signals of said devices to obtain therefrom the average heat flow rate through the mold wall or the average temperature of the cavity surface.

2. The apparatus of claim 1 in which said devices are of the electric resistance type.

References Cited

UNITED STATES PATENTS

| | | | |
|---|---|---|---|
| 3,644,110 | 2/1972 | Sendt | 65—356 X |
| 3,171,731 | 3/1965 | Barger et al. | 65—162 |
| 3,542,123 | 11/1970 | Hornbaker | 165—39 |

ARTHUR D. KELLOGG, Primary Examiner

U.S. Cl. X.R.

65—162, 356; 165—39

UNITED STATES PATENT OFFICE
CERTIFICATE OF CORRECTION

Patent No. 3,810,747  Dated May 14, 1974

Inventor(s) Peter Bork

It is certified that error appears in the above-identified patent and that said Letters Patent are hereby corrected as shown below:

In column 1, line 65, change "...3-K1 $(\vartheta_i - \vartheta_a)$..." to ---...Q-K1 $(\vartheta_i - \vartheta_a)$...--

In column 2, line 7, change "...$\vartheta_x = \vartheta_i$ K2 $(\vartheta_i - \vartheta_a)$..." to --...$\vartheta_x = \vartheta_i$ + K2 $(\vartheta_i - \vartheta_a)$...--

In column 2, line 15, change "determing" to --determining--

In column 3, line 45, change , "$\vartheta_i$ and $\vartheta_a$ represent..." to -- $R_i$ and $R_a$ represent....--

In column 3, line 27, change "other resistance" to --other resistances--

In column 3, line 46, change "...via the signal..." to --...via the signals...--

Signed and sealed this 3rd day of December 1974.

(SEAL)
Attest:

McCOY M. GIBSON JR.
Attesting Officer

C. MARSHALL DANN
Commissioner of Patents